US012197541B2

(12) United States Patent
Lomont et al.

(10) Patent No.: US 12,197,541 B2
(45) Date of Patent: *Jan. 14, 2025

(54) HYBRID CLUSTERED PREDICTION COMPUTER MODELING

(71) Applicant: Mastercard International Incorporated, Purchase, NY (US)

(72) Inventors: Thomas Lomont, Washington, DC (US); Sen Yang, Arlington, VA (US); Siyang Li, Arlington, VA (US); John Ingraham, Falls Church, VA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,137

(22) Filed: Jan. 6, 2023

(65) Prior Publication Data
US 2023/0267177 A1    Aug. 24, 2023

Related U.S. Application Data

(63) Continuation of application No. 16/692,835, filed on Nov. 22, 2019, now Pat. No. 11,551,024.

(51) Int. Cl.
*G06F 7/00* (2006.01)
*G06F 16/9035* (2019.01)
(Continued)

(52) U.S. Cl.
CPC .... *G06F 18/23213* (2023.01); *G06F 16/9035* (2019.01); *G06F 16/906* (2019.01); *G06F 18/214* (2023.01); *G06N 20/00* (2019.01)

(58) Field of Classification Search
CPC ............. G06F 16/9035; G06F 16/906; G06F 18/23213; G06F 18/214; G06Q 10/06375;
(Continued)

(56) References Cited

U.S. PATENT DOCUMENTS 6,314,427 B1 * 11/2001 Goldman ............. G06F 16/958
707/999.102
6,374,251 B1 * 4/2002 Fayyad ................. G06F 16/35
(Continued)

OTHER PUBLICATIONS

Final Office Action on US Appl. U.S. Appl. No. 16/692,835 dated May 4, 2022 (11 pages).
(Continued)

*Primary Examiner* — Mohammed R Uddin
(74) *Attorney, Agent, or Firm* — Foley & Lardner LLP

(57) ABSTRACT

Disclosed herein are systems and methods to efficiently execute predictions models to identify future values associated with various nodes. A server retrieves a set of nodes and generates a primary prediction model using data aggregated based on all nodes. The server then executes various clustering algorithms in order to segment the nodes into different clusters. The server then generates a secondary (corrective) prediction model to calculate a correction needed to improve the results achieved by executing the primary prediction model for each cluster. When a node with unknown/limited data and attributes is identified, the server identifies a cluster most similar the new node and further identifies a corresponding secondary prediction model. The server then executes the primary prediction model in conjunction with the identified secondary prediction model to populate a graphical user interface with an accurate predicted future attribute for the new node.

20 Claims, 12 Drawing Sheets

(51) Int. Cl.
*G06F 16/906* (2019.01)
*G06F 18/214* (2023.01)
*G06F 18/23213* (2023.01)
*G06N 20/00* (2019.01)

(58) Field of Classification Search
CPC ... G06Q 10/067; G06Q 30/0202; G06Q 10/04
See application file for complete search history.

(56) References Cited

U.S. PATENT DOCUMENTS

| | | | | |
|---|---|---|---|---|
| 6,655,963 | B1* | 12/2003 | Horvitz | G06Q 30/02 707/999.01 |
| 7,467,119 | B2* | 12/2008 | Saidi | G16H 50/70 600/407 |
| 7,480,640 | B1* | 1/2009 | Elad | G06Q 10/10 706/14 |
| 10,417,650 | B1* | 9/2019 | Gong | G06Q 30/0202 |
| 10,430,727 | B1* | 10/2019 | Fusillo | G06N 20/00 |
| 10,650,432 | B1* | 5/2020 | Joseph | G06N 3/08 |
| 10,826,932 | B2* | 11/2020 | Abbaszadeh | G06F 18/2163 |
| 2002/0178155 | A1* | 11/2002 | Sakurai | G06F 16/313 |
| 2003/0140023 | A1* | 7/2003 | Ferguson | G06Q 30/02 706/15 |
| 2007/0088534 | A1* | 4/2007 | MacArthur | G05B 13/0295 703/17 |
| 2009/0024546 | A1* | 1/2009 | Ficcaglia | G06Q 30/02 706/46 |
| 2010/0082592 | A1* | 4/2010 | Ruvini | G06F 16/288 707/706 |
| 2011/0208681 | A1* | 8/2011 | Kuecuekyan | G06N 5/022 706/21 |
| 2012/0077158 | A1* | 3/2012 | Jastrzembski | G06Q 50/205 434/219 |
| 2015/0235133 | A1* | 8/2015 | Aoki | G06N 5/04 706/12 |
| 2016/0275549 | A1* | 9/2016 | Amano | G06N 20/00 |
| 2016/0366036 | A1* | 12/2016 | Gupta | G06F 3/0481 |
| 2017/0316438 | A1* | 11/2017 | Konig | G06Q 30/01 |
| 2017/0339460 | A1* | 11/2017 | Sullivan | H04N 21/4665 |
| 2018/0150856 | A1* | 5/2018 | Zhu | G06Q 30/0204 |
| 2018/0225581 | A1* | 8/2018 | Oyamada | G06F 16/285 |
| 2018/0253515 | A1* | 9/2018 | Di | G06N 5/01 |
| 2018/0308124 | A1* | 10/2018 | Gao | G06N 20/00 |
| 2019/0102694 | A1* | 4/2019 | Yates | G06N 3/045 |
| 2019/0156216 | A1* | 5/2019 | Gupta | G06N 3/126 |
| 2019/0228336 | A1* | 7/2019 | Kanagawa | G06N 5/02 |
| 2019/0378050 | A1* | 12/2019 | Edkin | G06N 20/20 |
| 2020/0126126 | A1* | 4/2020 | Briancon | G06N 20/20 |
| 2020/0302234 | A1* | 9/2020 | Walters | G06F 16/9035 |
| 2020/0349396 | A1* | 11/2020 | Hsieh | G06V 10/7788 |
| 2020/0349438 | A1* | 11/2020 | Takamatsu | G06N 3/08 |
| 2020/0394533 | A1* | 12/2020 | Ramalingam | G06F 18/25 |
| 2020/0402057 | A1* | 12/2020 | Das | H04W 4/021 |
| 2021/0042771 | A1* | 2/2021 | Sharma | G06N 20/00 |
| 2021/0110294 | A1* | 4/2021 | Elewitz | G06N 20/00 |
| 2021/0185408 | A1* | 6/2021 | Ray | H04N 21/812 |
| 2022/0214662 | A1* | 7/2022 | Panda | H01L 21/67253 |
| 2023/0419304 | A1* | 12/2023 | Cella | G06Q 20/3674 |
| 2024/0012992 | A1* | 1/2024 | Tamm | G06V 10/764 |

OTHER PUBLICATIONS

Non-Final Office Action issued in U.S. Appl. No. 16/692,835 dated Jan. 5, 2022.
Notice of Allowance on U.S. Appl. No. 16/692,835 Dtd Sep. 6, 2022.

* cited by examiner

HYBRID CLUSTERED PREDICTION COMPUTER MODELING

CROSS-REFERENCE TO RELATED APPLICATIONS

This application is a continuation of U.S. patent application Ser. No. 16/692,835, filed Nov. 12, 2022, which is incorporated herein in its entirety for all purposes.

TECHNICAL FIELD

This application generally relates to generating more efficient and accurate computer modeling techniques.

BACKGROUND

In order to predict a future attribute of a node, conventional software solutions and computer modeling techniques rely on predictions models, such as time-series data models. Conventional software solutions generate a time-series prediction model for all nodes within a dataset where the time-series prediction model uses previous attributes associated with different nodes to predict a future value/attribute of a particular node. However, conventional software solutions suffer from technical problems. Conventional software solutions that utilize a holistic approach, where the time-series model is generated based on all nodes, do not produce accurate results. Time-series models generated based on all nodes are not accurate for all node segmentations because they predict a holistic value based on all nodes and not peculiar attributes of each node or each segment of the nodes. Therefore, the results generated using holistic time-series modeling techniques tend to identify an overall trend of all nodes, which are not specific to a particular node or a particular segment of nodes.

Technical solutions directed towards solving the above-described technical problem have not been satisfactory. In order to remedy the technical problem identified above, conventional software solutions must generate more granular time-series models. For instance, conventional software solutions generate a time-series model for each node and execute multiple time-series models to identify a future attribute of a given node. Even though this solution is more accurate than conventional solutions, it requires heavy computing power because a central server must first generate and execute a multitude of computer models. Therefore, conventional solutions to the technical problems faced by conventional software solutions are inadequate. Furthermore, existing technical solutions are also undesirable because reconfiguring existing prediction models are timely, costly, and inefficient.

Current technical solutions require a complete reconfiguration of existing computer software. This reconfiguration is highly undesirable because it creates an interruption of service and it may affect other computer software modules that rely on the existing modeling techniques.

SUMMARY

For the aforementioned reasons, there is a desire for an efficient method to identify a future attribute of a node (within a set of nodes) without reconfiguring any implemented software solution. By generating a limited number of corrective prediction models and executing the time-series models in an optimized and efficient manner, without executing unnecessary models and without requiring heavy computing power, the methods and systems described herein provide more accurate results.

What is desired is a hybrid method that generates and executes a prediction model and executes a corrective prediction model specific to a cluster corresponding to the node being predicted. Using the methods and systems described herein, the prediction model can be retrofitted and improved with an additional corrective prediction model that is minimally invasive (e.g., minimally interrupts dataflow to the existing prediction model and minimally interferes with the operational steps of an existing system architecture). The methods and systems described herein provide a method to improve results with minimal to no service interruptions.

In an embodiment, a method comprises generating, by a server, a first prediction computer model for a set of nodes where the server generates the first prediction computer model using an attribute value for each node within the set of nodes and a corresponding time stamp; executing, by the server, a clustering computer model to generate a plurality of clusters for the set of nodes where each cluster comprises a subset of nodes, whereby the clustering computer model determines each subset of nodes within each cluster in response to receiving each node's values corresponding to at least one attribute; executing, by the server, the first prediction computer model to identify a predicted value for each cluster based on an attribute of each respective cluster; calculating, by the server, a difference between the predicted value for each cluster generated by the first prediction computer model and the attribute value for each respective cluster; generating, by the server, a plurality of second prediction computer models where each second prediction computer model corresponds to at least one cluster, the plurality of second prediction computer models configured to calculate the difference between an attribute of each cluster and the predicted value for that cluster generated by the first prediction computer model; receiving, by the server from an electronic device, a request to predict a value of a first attribute associated with a first node; retrieving, by the server, a plurality of values corresponding to a plurality of attributes of the first node; executing, by the server, the first prediction computer model to generate a first predicted value for the first node; in response to identifying a cluster associated with the first node, retrieving a second prediction computer model within the plurality of second prediction computer models that corresponds to the identified cluster; executing, by the server, the retrieved second prediction computer model by inputting the first predicted value to receive a second predicted value; populating, by the server, a graphical user interface on the electronic device with the second predicted value.

In another embodiment, a computer system comprises an electronic device configured to generate and transmit a request to determine a future value of a first attribute associated with a first node; a database configured to store data associated with a set of nodes; a server in communication with the database and the electronic device, the server configured to: generate a first prediction computer model for the set of nodes where the server generates the prediction computer model using an attribute value for each node within the set of nodes and a corresponding time stamp; execute a clustering computer model to generate a plurality of clusters for the set of nodes where each cluster comprises a subset of nodes, whereby the clustering computer model determines each subset of nodes within each cluster in response to receiving each node's values corresponding to at least one attribute; execute the first prediction computer model to identify a predicted value for each cluster based on an attribute of each respective cluster; calculate a difference between the predicted value for each cluster generated by the first prediction computer model and the attribute value for each respective cluster; generate a plurality of second prediction computer models where each second prediction computer model corresponds to at least one cluster, the plurality of second prediction computer models configured to calculate the difference between an attribute of each cluster and the predicted value for that cluster generated by the first prediction computer model; receive, from the electronic device, the request to predict the future value; retrieve a plurality of values corresponding to a plurality of attributes of the first node; execute the first prediction computer model to generate a first predicted value for the first node; in response to identifying a cluster associated with the first node, retrieve a second prediction computer model within the plurality of second prediction computer models that corresponds to the identified cluster; execute the retrieved second prediction computer model by inputting the first predicted value to receive a second predicted value; populate a graphical user interface on the electronic device with the second predicted value.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
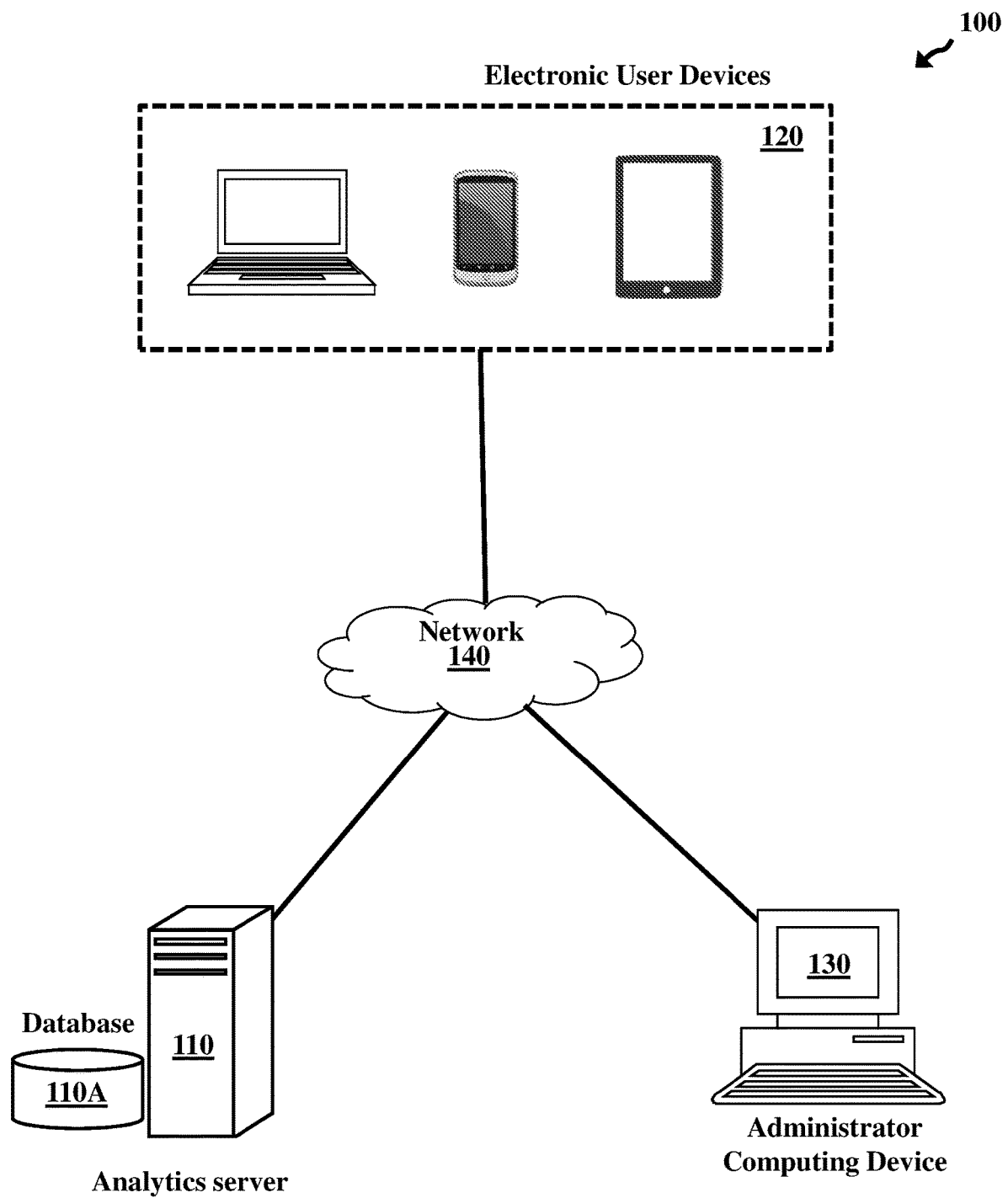
FIG. 1 illustrates a computer system for predicting future attributes leveraging hybrid clustering and time-series modeling techniques, according to an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates components of a system 100 for predicting future attributes leveraging hybrid clustering and time-series modeling techniques, according to an embodiment. Even though some embodiments herein describe the prediction models as time-series models or time-series prediction models, it is expressly understood that prediction modeling is not limited to time-series models. Methods and systems described herein can use any prediction computer modeling technique to calculate future attributes of different nodes.

The system 100 may comprise an analytics server 110 with a database 110A, a set of electronic user devices 120, and an administrator computing device 130. The computing features described above are connected via a network 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The analytics server 110 may be any computing device comprising a processor and other computing hardware and software components, configured to perform the various tasks described herein. The analytics server 110 may be logically and physically organized within the same or different devices or structures of FIG. 1. The analytics server 110 may be distributed across any number of physical structures and locations (e.g., cabinets, rooms, buildings, and cities). In operation, the analytics server 110 may receive a request from the administrator computing device 130 or any of the electronic user devices 120 to determine a future attribute of a node. The request may require the analytics server 110 to retrieve known user data from the database 110A storing the user data, such as user accounts, customer transactions and other relevant data. The database 110A may comprise a set of nodes corresponding to a set of user data from which the analytics server 110 may generate a predicted attribute for a node not included in the database 110A (or not a part of the nodes with known data). In a non-limiting example, a client may request the analytics server 110 to analyze data associated with a set of existing users to predict a new user's future attributes.

The administrator computing device 130 may be any computing device allowing a client to interact with the analytics server 110. The administrator computing device 130 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The administrator computing device 130 may comprise any number of input and output devices supporting various types of data, such as text, image, audio, video, and the like.

The database 110A may be any non-transitory machine-readable media configured to store a set of nodes with known data, such as existing users and their account information. As used herein nodes may represent any unit of data or any category of data. For instance, the set of nodes stored within the database 110A may represent a set of users (existing customers), a set of electronic devices, and the like.

When the set of nodes represents a set of users, each node represents a user and each node may be associated with data (e.g., various attributes) corresponding to that particular user. For instance, each node may include metadata that corresponds to different attributes of each user, such as demographic data, account information, transaction history, and the like. User account information may comprise customer identifiers, address, contact information (e.g., e-mail address, phone number), and demographic data (e.g., age, gender, income, and location), and the like. The transaction information may comprise each user's historical transactions and a corresponding category and/or timestamp, transaction data, transaction items, transaction amount, payment methods, and the like.

Based on the set of nodes stored onto the database 110A and the corresponding data, the analytics server 110 may execute a clustering computer model to generate a number of clusters. The clustering computer model may segment or group the set of nodes into a number of clusters based on one or multiple dimensions. For clustering purposes, each dimension may represent an attribute of the nodes within the set of nodes. The analytics server 110 may consider only one attribute when clustering (e.g., grouping or segmenting) different nodes into one or more clusters. For instance, the analytics server 110 may cluster/segment the set of nodes based on a single attribute of each node (e.g., age range, income range, or number of transactions per month). In that embodiment, each cluster of nodes may include nodes (users) that are within the predetermined range of attribute, such as age range (e.g., 25-35, 36-45, and 46-66).

In some embodiments, the analytics server 110 may cluster the set of nodes based on multiple dimensions (e.g., age range and income range). By executing the clustering computer model, the analytics server 110 may group similar nodes based on their respective attributes. Different nodes (e.g., users) in the same cluster are more similar (e.g., with similar values for the set of attributes) to each other than to those in other clusters.

After executing clustering modeling and generating multiple clusters, the analytics server 110 may generate a secondary or corrective prediction model for each cluster using attributes of the nodes within each particular cluster. An example of a corrective prediction model is a time-series model. A time-series model comprises a series of data points corresponding to one or more attributes of each node indexed (or listed or graphed) in accordance with a time order. For instance, in a non-limiting example, a computer model may ingest data points for one or more attributes associated with each node within the set of nodes where the corrective prediction computer model is generated based on a time value as an independent variable and the attribute data point serves as the dependent variable.

The analytics server 110 may use the time-series model to analyze attribute data points of each node, to extract meaningful characteristics of the data, and to predict future attribute data points. For instance, the analytics server may forecast and predict future values based on previously observed values. The analytics server 110 may use any regression algorithm to identify a trend and to predict the future value of a given node.

As will be described below, the corrective prediction model is applied a primary prediction model to improve the results. For instance, a primary prediction model may be holistic model that uses aggregated data for all the nodes. This primary prediction model may not be very accurate because it does not account for attribute differences between different segments of nodes. In order to improve this inaccuracy, the analytics server 110 may generate a corrective model for each cluster. When executed in addition to the primary prediction model, the secondary/corrective model can adjust the results according to attributes of each cluster, thereby providing more accurate results that are tailored to a particular cluster of nodes. Using the above-described methods, the analytics server 110 is not required to retrofit, interrupt, or modify the primary prediction model. This allows the analytics server 110 to have minimal to no interruption in execution of the primary prediction model.

The electronic user devices 120 may be any computing device allowing a user to interact with the analytics server 110. The electronic user devices 120 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 120 may comprise any number of input and output devices supporting various types of data, such as text, image, audio, video, and the like. The electronic user devices associated with the test customers may receive the promotional materials. A customer/user operating the electronic user device 120 may transmit a request to the analytics server 110 where the analytics server 110 performs a variety of analytics and predicts future values of a node (e.g., user).

The analytics server 110 may generate and display a user interface on the electronic user devices 120, where a user operating the electronic user device 120 can input the request to identify future values, their attributes, and identification of different nodes. For instance, a user can operate an electronic user device 120 to transmit a request to the analytics server 110. As will be described below, the request may identify a user and instruct the analytics server 110 to calculate a future value of an attribute of identified the user. For instance, the request may identify a new user and his/her attributes (e.g., age, sex, location, income level) and may also instruct the analytics server 110 to analyze data for existing users (and historical data) to predict how much the user will spend within the first six month of opening his/her account.

Upon receiving the request, the analytics server 110 may then calculate the future value requested and display the result on a graphical user interface displayed on the electronic user devices 120. An example of the graphical user interface generated and hosted by the analytics server 110 may be a website. The analytics server 110 may host a website accessible to end-users, where the content presented via the various webpages may be controlled based upon each particular user's role. Non-limiting examples of such computing devices may include workstation computers, laptop computers, server computers, laptop computers, and the like.

The analytics server 110 may execute software applications configured to display the user interface (e.g., host a website), which may generate and serve various webpages to electronic user devices 120 or the administrator computing device 130. The website may be used to generate and access data stored on the database 110A or the analytics results calculated by the analytics server 110. In some implementations, the analytics server 110 may be configured to require user authentication based upon a set of user authorization credentials (e.g., username, password, biometrics, cryptographic certificate, and the like). In such implementations, the analytics server 110 may access the database 110A configured to store user credentials, which the analytics server 110 may be configured to reference in order to determine whether a set of entered credentials (purportedly authenticating the user) match an appropriate set of credentials that identify/authenticate the user.

The request may be generated and transmitted to the analytics server 110 from either the administrator computing device 130 or the electronic user device 120. In some configurations, the administrator computing device 130 may monitor user requests received by the analytics server 110.

Figure 2A:
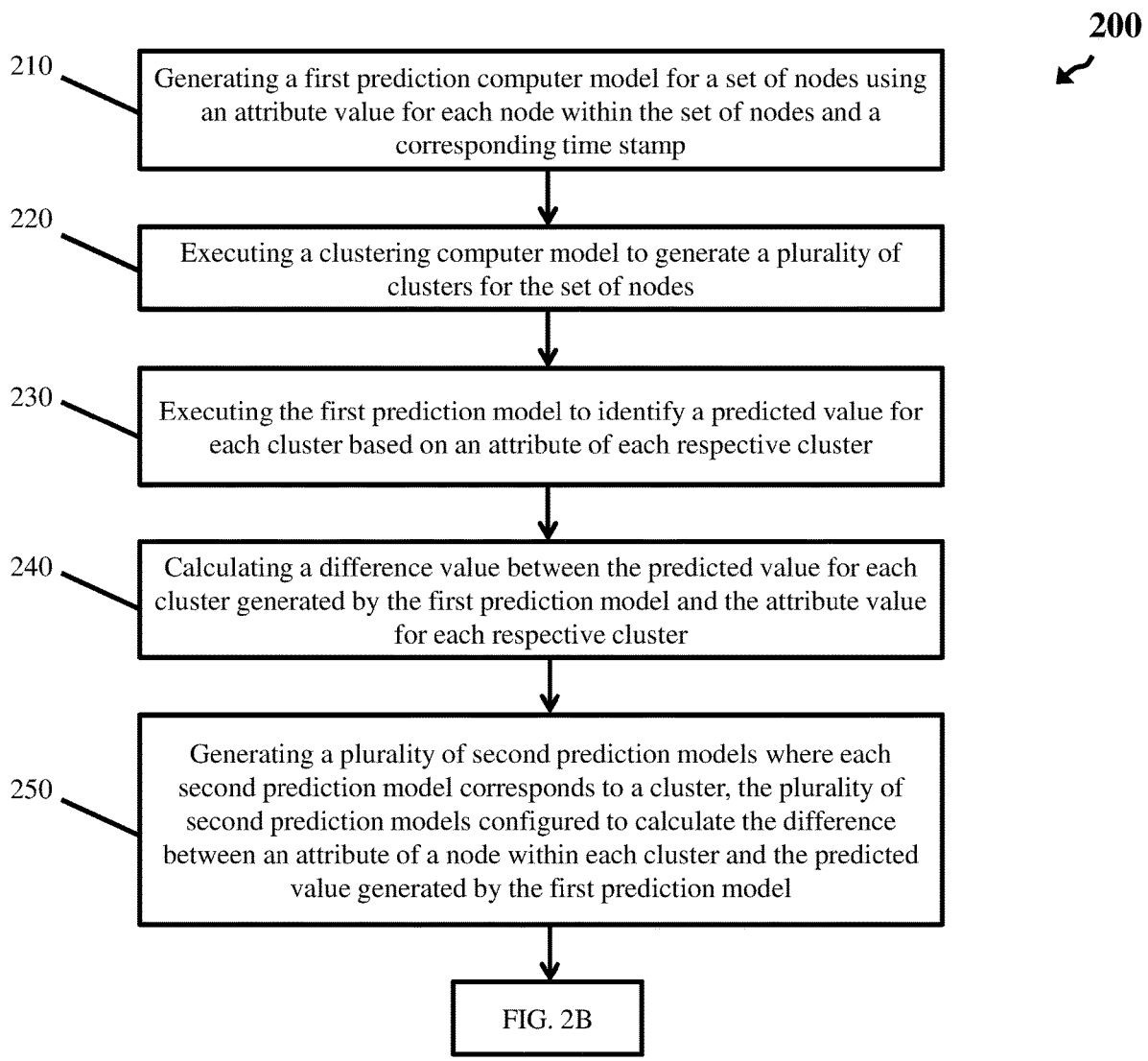
FIGS. 2A-2B illustrate a flowchart depicting operational steps for predicting future attributes leveraging hybrid clustering and time-series modeling techniques, according to an embodiment.

FIG. 2 illustrates execution steps of a method 200 for calculating a future value of a node by leveraging hybrid clustering and time-series modeling techniques, according to an embodiment. Other embodiments may comprise additional or alternative steps; or may omit some steps altogether. In the embodiment described below, the method 200 is performed by a server, such as the analytics server described in FIG. 1. However, in some configurations, the method 200 may be performed by multiple servers or computing devices, such as the computing features described in FIG. 1 or a distributed system architecture. Any execution step (as a whole or any part of any execution step) can be combined with other steps described herein.

At step 210, the analytics server may generate a first prediction computer model for a set of nodes where the server generates the prediction model using an attribute value for each node within the set of nodes and a corresponding time stamp. The analytics server may retrieve, from a database, a set of nodes and each node's values corresponding to the first attribute and the plurality of attributes, each node corresponding to a user and each node's corresponding values representing historical data stored onto the database. As describe above, in order to predict a future value of the identified node, the analytics server may first retrieve a set of nodes that represent existing users with known values (e.g., historical values). The analytics server may generate a first prediction model for the retrieved set of nodes.

The first prediction model may be a holistic model that includes all nodes within the retrieved set of nodes. The analytics server may aggregate all the data associated with all the nodes and generate the first prediction model accordingly. For instance, the first prediction model may include all users (nodes).

The analytics server may generate the first predictions model (e.g., time-series prediction model) for each node and its corresponding attribute within the retrieved set of nodes. Each node's value may correspond to one attribute and a corresponding time value. For instance, the analytics server may retrieve each node's data corresponding to an attribute (e.g., number of transactions) and a timestamp of each transaction to generate the first prediction model. The analytics server may then use a variety of programming languages to generate a time-series forecasting computer model.

In some embodiments, the analytics server may generate multiple time-series models for each attribute. The analytics server may retrieve all relevant data associated with the nodes within the set of nodes and may generate multiple prediction models where each prediction model is configured to predict a different attribute. For instance, the analytics server may generate a first time-series model that corresponds to number of transactions of each user. The first time-series model may include historical number of transactions per a predetermined time period (e.g., day, month, quarter, or year). The time-series model can use various data analysis methods (e.g., logistic regression models) to identify a trend and predict a future number of transaction for any node. Similarly, the analytics server may generate a second time-series model for the same set of nodes where the time-series model corresponds to an overall amount spent by each node. The analytics server may execute the second time-series model to predict a user's overall spending amount given a timeline.

Additionally, or alternatively, the analytics server may also generate one or more time-series model that corresponds to more than one attribute. For instance, one prediction model may correspond to multiple attributes.

At step 220, the analytics server may execute a clustering computer model to generate a plurality of clusters for the set of nodes where each cluster comprises a subset of nodes, whereby the clustering computer model determines each subset of nodes within each cluster in response to receiving each node's values corresponding to at least one attribute.

The analytics server may execute a clustering computer model to generate a plurality of clusters for the set of nodes where each cluster comprises a subset of nodes, whereby the clustering computer model determines each subset of nodes within each cluster in response to receiving each node's values corresponding to at least one attribute. The analytics server may execute a clustering computer model using the set of nodes to generate one or more clusters to include similar users. As a result, each cluster may comprise one or more nodes.

In a non-limiting example, the analytics server may calculate a multidimensional distance value between each node within the set of nodes where each dimension of the multidimensional distance represents an attribute different between two nodes. Therefore, each dimension may correspond to an attribute of each node within the set of nodes. The analytics server may assign a cluster to each node based on its respective distance to other nodes, and iteratively repeat calculating the distance value and assigning each node to a cluster until the distance values of nodes within each cluster satisfy a distance threshold. As a result, the nodes within each cluster may include similar nodes (e.g., all users within the same range of income level or same range of money spent within the last six months).

The analytics server may execute a clustering computer model using the set of nodes to generate a number of clusters based on multiple dimensions where each dimension corresponds to an attribute of each nodes within the set of nodes. The set of attributes may include prior spend in a predetermined period, days since last transaction, number of transactions in a certain period, demographic data (e.g., age, sex, income level, and education level), and any other relevant attributes. The analytics server may generate a number of clusters with each cluster including one or more nodes with similar values for the set of attributes.

By executing the clustering computer model, the analytics server may group the set of nodes (e.g., the set of customers/users) into a number of clusters. Nodes (e.g., users) in the same cluster are more similar (in the sense of the set of attributes used to calculate the distance) to each other than to those in other clusters. For example, assuming the analytics server executes the clustering computer model based on three attributes including age, gender, and income level. The customers in each cluster may be within the same age range, with the same gender, and within the same income bracket.

In some embodiments, the analytics server may divide the set of nodes into a predetermined number of clusters (e.g., five or ten clusters). For example, the analytics server may receive a parameter for the number of clusters from an administrative user. The analytics server may iteratively execute the clustering computer model and only stop until the analytics server has reached the predetermined number of clusters. In some other embodiments, the analytics server may iteratively execute the clustering computer model and only stop until the distance values of nodes within each cluster satisfying a distance threshold. As a result, the number of clusters will not be predetermined. Alternatively, the analytics server may iteratively execute the clustering computer model until the distance values decreasing is less than a threshold or the distance values stop decreasing.

The distance between two nodes may represent a difference of two nodes (users) with respect to a single attribute. Therefore, in an example, a "spend-30 distance" between two nodes represents how similar the two nodes are with respect to spending money within the last 30 days. As described herein, the analytics server may utilize this distance to identify similar users and cluster the nodes accordingly. Furthermore, because the analytics server considers more than one attribute when assigning nodes to different clusters, the analytics server may generate the distance representing more than one attribute. The analytics server may utilize any distance calculating technique, such as the Euclidean distance or any other distance calculation method to generate the multidimensional distance value for each node.

In some embodiments, the analytics server may use a non-hierarchical clustering method, such as K-means algorithm, to generate a predetermined number of the clusters. For example, the analytics server may generate 10 clusters. The analytics server may start with an initial set of cluster centers. The initial set of cluster centers may be 10 nodes randomly chosen from the set of nodes. The analytics server may calculate the Euclidean distance between each node to each of the centers. The analytics server may minimize the within-cluster scatter, which is the average distance for every node to its cluster center. In Euclidean space, the within-cluster scatter is the sum of squared distances of each node to the cluster centers. Specifically, the analytics server may minimize the within-cluster scatter with the following two-step iterative process. In the first step, the analytics server may assign each node to its closest cluster center. In the second step, the analytics server may calculate the average location of all the nodes assigned to each cluster and move the cluster center to the average location (e.g., readjust the data point). By repeating this process, the analytics server may iteratively reassign the nodes to more appropriate clusters until either the algorithm converges, or the within-cluster scatter reaches a minimum distance value (e.g., stops decreasing).

The clustering algorithm implemented in the clustering computer model may be K-means clustering, mean-shift clustering, density-based spatial clustering of applications with noise, expectation-maximization clustering, hierarchical clustering, and any other clustering algorithms.

At step 230, the analytic server may execute the first prediction model to identify a predicted value for each cluster based on an attribute of each respective cluster. The analytics server may execute the time-series prediction model generated in step 210 to calculate a preliminary calculated prediction value (attribute) for each node within each cluster. For instance, the analytics server may execute the first prediction model by inputting at least one value corresponding to the plurality of attributes of each node to calculate a value for a particular attribute for each node within each cluster. The analytics server may execute the first prediction model to predict a value for each node where the value is already known to the analytics server. For instance, the analytics server may "predict" a number of transaction for a user in within a time period where the actual number of transaction is stored and can be retrieved by the analytics server. As will be described below, the analytics server may use the predicted value and the actual value to calibrate the results by generating secondary and corrective models.

At step 240, the analytics server may calculate a difference value between the predicted value for each cluster generated by the first prediction model and the attribute value for each respective cluster. The analytics server may execute the time-series model (e.g., first prediction model) using known values to predict an attribute for various nodes within each cluster. The analytics server may then retrieve an actual value that corresponds to the predicted value using the first prediction model. The analytics server may then calculate the difference by comparing the actual value with the predicted value.

Referring now to FIGS. 5A-5D, visual representations of the methods and systems that calculate the difference between attributes of known nodes and the predicted values using the first prediction model generated in step 210 are illustrated. As depicted in FIGS. 5A-5D, the analytics server may execute the time-series model 510 to predict attributes associated with various nodes. The time-series model 510 may refer to a holistic prediction model for all the nodes (regardless of their segmentation properties), which is similar to the first prediction model. Each data point within the time-series model 510, represents an attribute value predicted by the time-series model 510 and a corresponding time value. For instance, data point 511 demonstrates that when the analytics server executes the time-series model 510, the analytics server predicts that at time 512, attribute 1 will have a value 513.

Figure 5A:
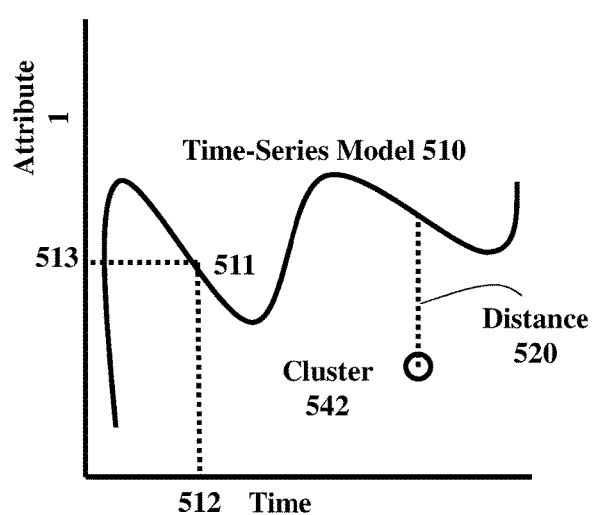
FIGS. 5A-5F illustrate non-limiting examples of visual representations of first and second prediction models, according to various embodiments.
Figure 5B:
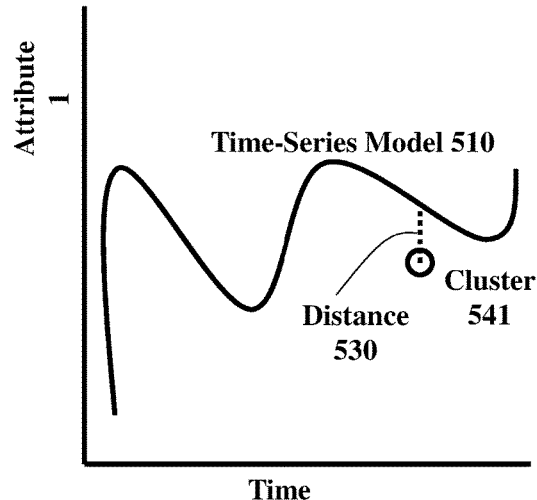
Figure 5C:
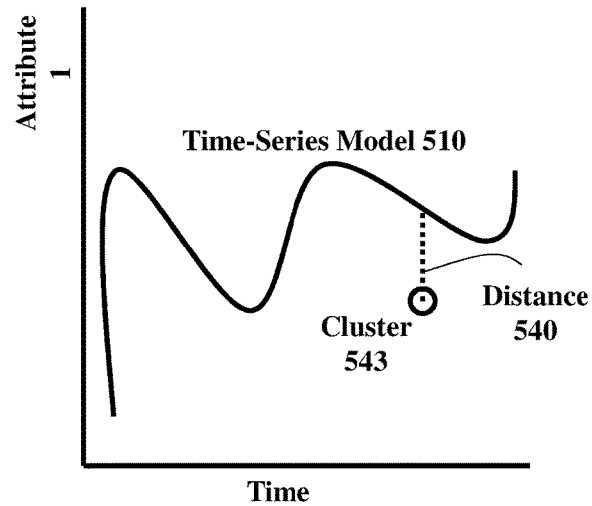
Figure 5D:
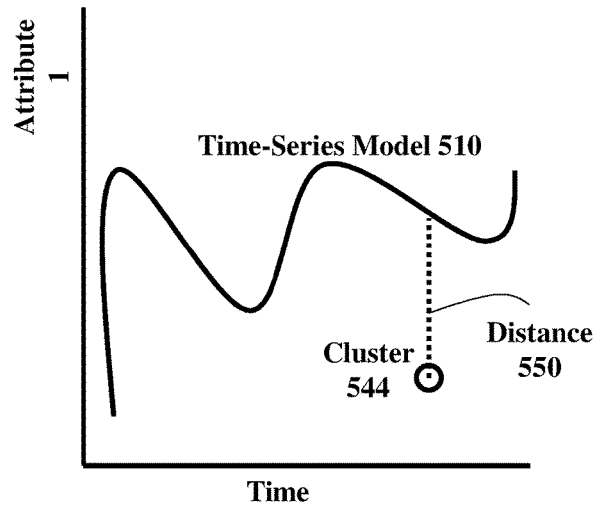

As depicted, the analytics server may execute the time-series model 510 generated in step 210 and may generate results visually illustrated in FIGS. 5A-5D. The analytics server may then retrieve a value of attribute 1 for at least one node within each cluster and compares the actual value of the node (attribute 1) with the predicted value using the time-series model 510. For instance, as depicted in FIG. 5A, the analytics server compares the value for cluster 542 with the value predicted using time-series model 510 (distance 520). Similarly, the analytics server calculates distance 530 (representing a distance between the actual value for attribute 1 for cluster 541 and time-series 510), distance 540 (representing distance between the actual value for attribute 1 for cluster 543 and time-series model 510), and distance 550 (representing distance between the actual value for attribute 1 for cluster 544 and time-series model 510).

Figure 5E:
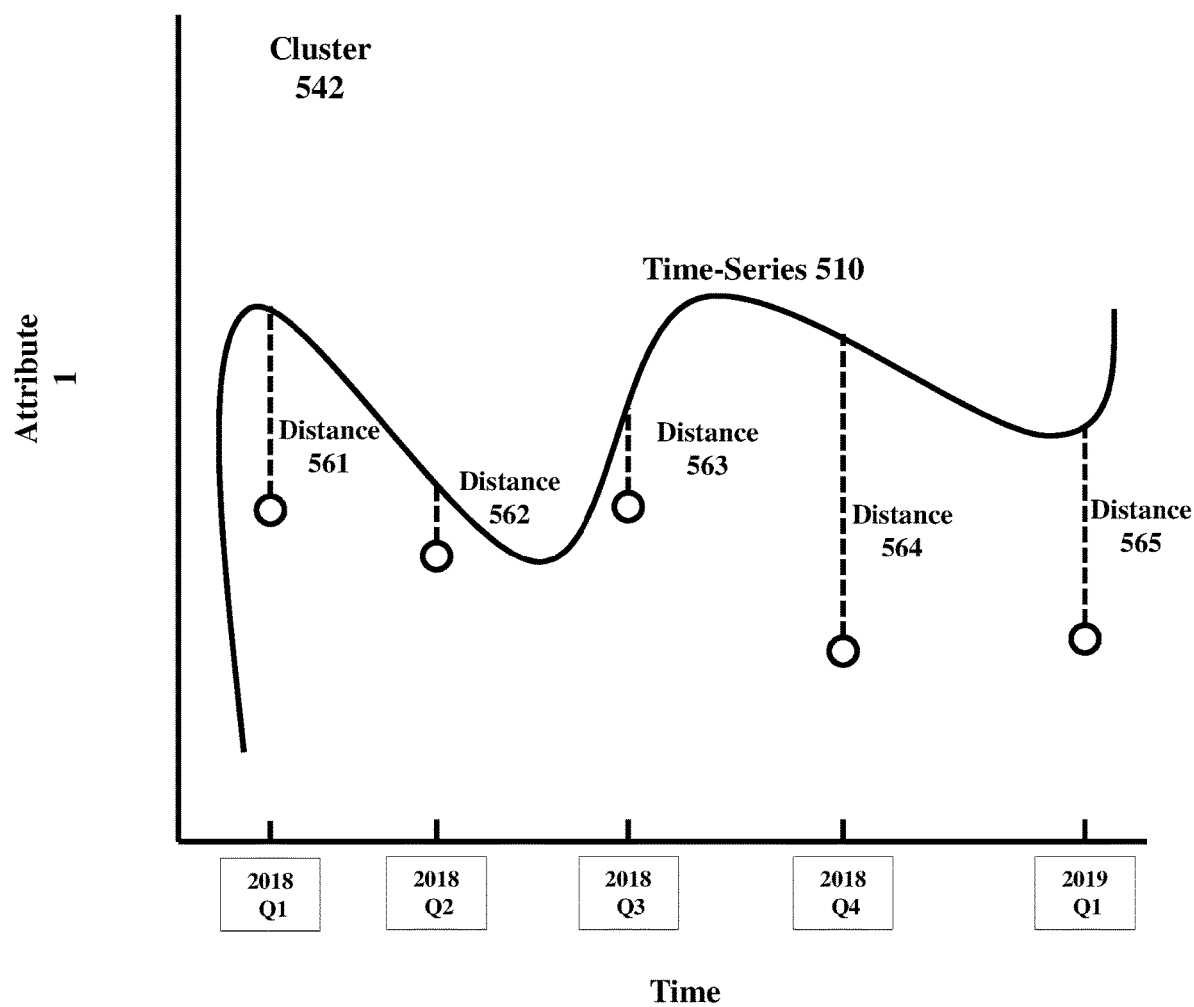

Similar to the methods described above, the analytics server may calculate a distance for each cluster generated in step 220 for each time value and each attribute, as depicted in FIG. 5E. For instance, the analytics server may calculate distance values 561-565 where each distance value represents a difference in value between an actual attribute for a particular time in comparison with a predicted attribute using the first prediction model (e.g., time-series model 510) for the same time. The analytics server may iteratively calculate the distances for any predetermined time period, such as monthly, bi-monthly, weekly, or daily. As illustrated in FIG. 5E, the analytics server calculates a distance between the actual value for nodes within the cluster 542 and the predicted values using the time-series model 510 on a quarterly basis.

The analytics server may repeat the above-described method as many times as needed to achieve a distributed and more granular distribution of the differences between actual values for each cluster and the predicted value for the cluster using the first prediction model. An administrator operating an administrator computer depicted in FIG. 1, may control how many times the above-mentioned calculation must be repeated. For instance, an administrator may log in the website described above and input a time period for which the analytics server will calculate a value for each cluster and compare the value predicted with an actual value for the same time period for the same cluster.

Referring back to FIG. 2A, at step 250, the analytics server may generate a plurality of second prediction models where each second prediction model corresponds to a cluster, the plurality of second prediction models configured to calculate the difference between an attribute of a node within each cluster and the predicted value generated by the first prediction model. As described above, the analytics server may calculate a distance between an actual attribute of the nodes within a cluster and its corresponding predicted values. The distance may represent an error because the distance is how incorrect a prediction is. Therefore, the analytics server may generate a secondary (corrective) prediction model that can predict the distance between a predicted future attribute (using the first prediction model) and the actual future attribute.

Figure 5F:
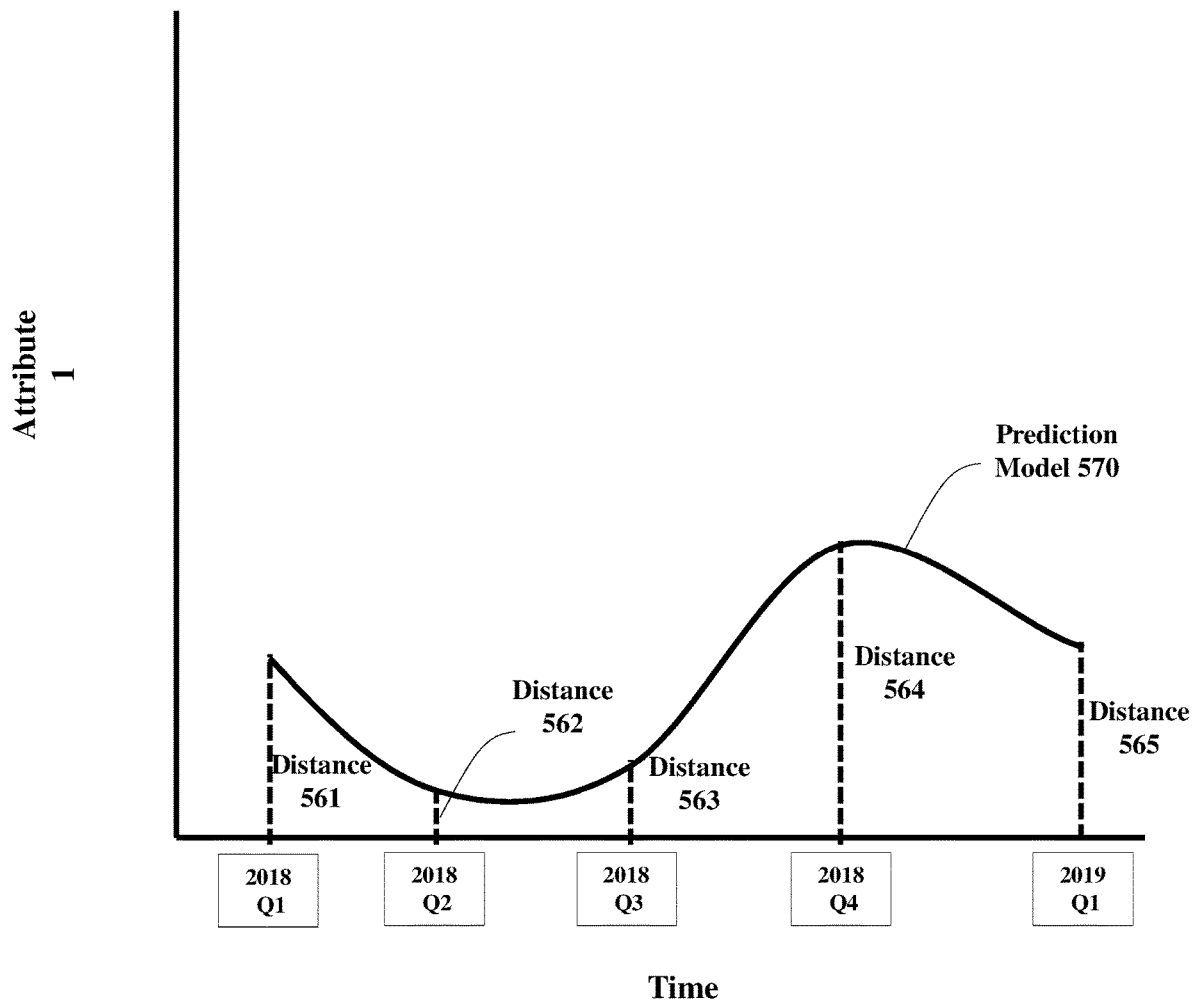

Referring now to FIGS. 5E-5F, using the distances calculated, the analytics server may generate a second prediction model where the prediction model predicts the distance between an actual value for a node within a cluster and the predicted value for the same node using the first prediction model (e.g., time-series model generated in step 210). A visual illustration of the second prediction model (e.g., prediction model 570) is illustrated in FIG. 5F.

The prediction model 570 corresponds to the distances calculated and illustrated in FIG. 5E. The analytics server may generate the prediction model 570 using various methodologies, as described in relation to generating the first prediction model. In one embodiment, the prediction model 570 may be a time-series model. However the second prediction model is not limited to being a time-series model. The analytics server may generate various other prediction models using the distances calculated. As depicted, the analytics server may use distance values 561-565 to generate the time-series model (prediction model 570). The prediction model 570 may be configured to calculate distance between the actual and predicted values for a given attributes when executing the first prediction. For example, the analytics server may execute the prediction models 572 identify whether a correction is needed when executing the first prediction model (time-series model 510).

The prediction model 570 may be used as a corrective model to be executed in addition to the first prediction model. In a non-limiting example, the analytics server may execute the first prediction model to calculate a predicted number of transactions (i.e., attribute) for a particular cluster of nodes. The first prediction model may predict that a number of transactions for a particular cluster of node is 15. As will be described below, the analytics server may then execute the prediction model 570 and determine that a correction is needed when calculating the number of transactions using the first prediction model. Upon executing the prediction model 570, the analytics server may determine that a correction of −5 is needed for that particular cluster in that particular timeframe. Therefore, the analytics server corrects the predicted value (as a result of execution of the first prediction model) using the correction calculated (as a result of execution of the second prediction model). Accordingly, the analytics server determines that the number of transactions is 10 and not 15.

The analytics server may execute the above-described methodology for each cluster. Therefore, the analytics server may generate a second prediction model for each cluster generated in step 220. Non-limiting examples of generating are illustrated in FIGS. 3-4.

Figure 3A:
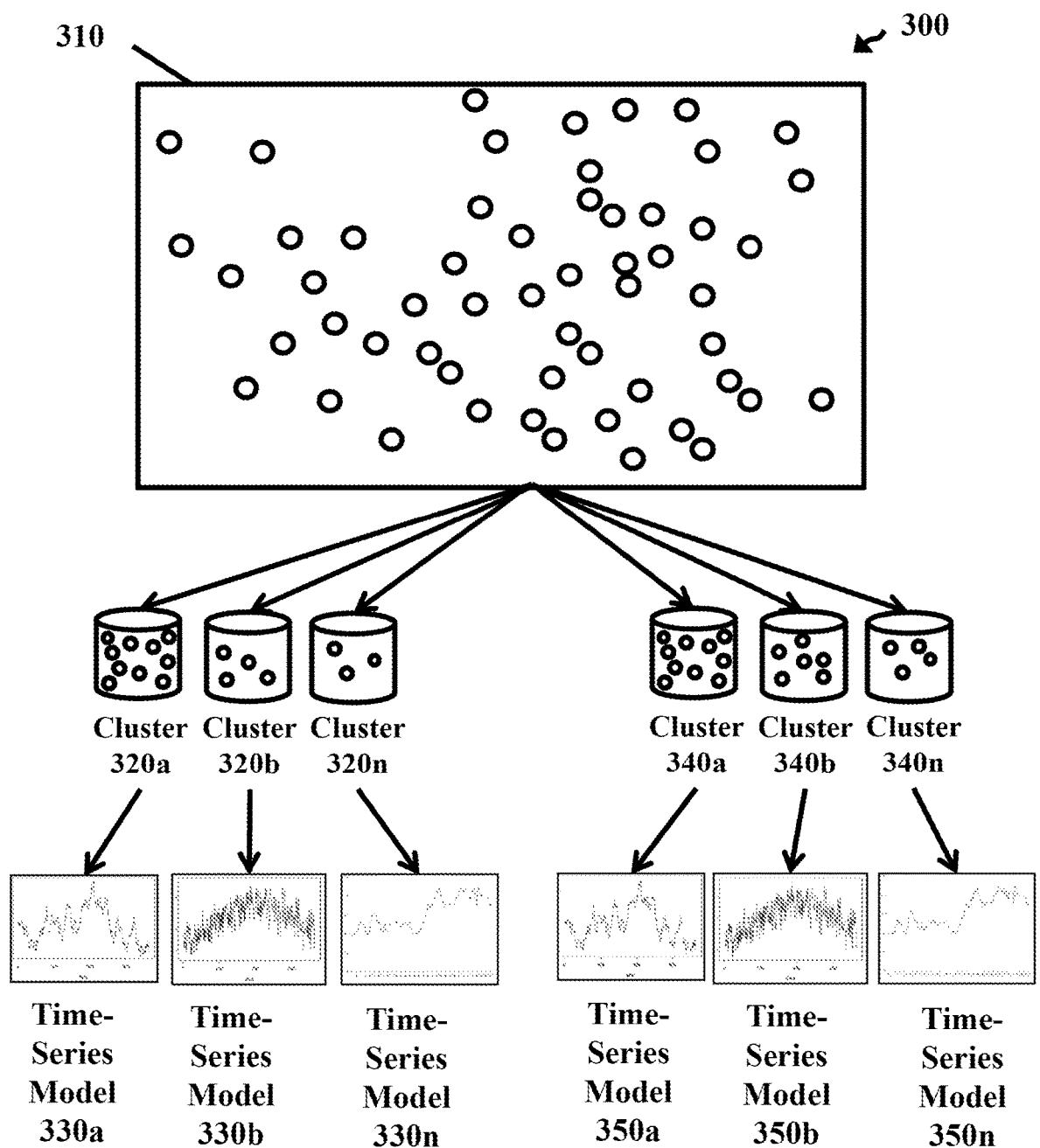
FIG. 3A-3B illustrate a non-limiting example of generating a prediction model for each cluster within a set of nodes, according to an embodiment.
Figure 3B:
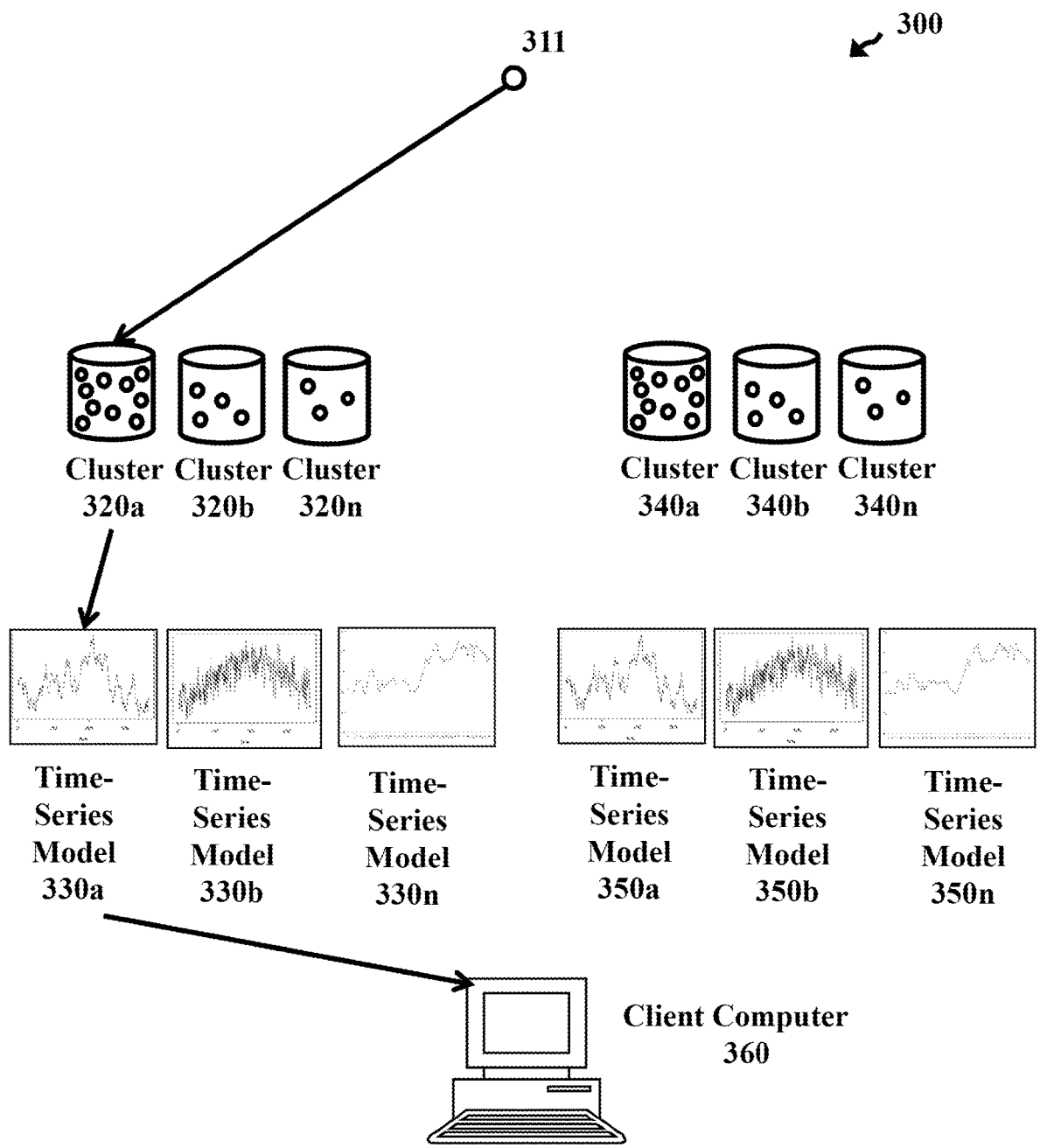
Figure 4:
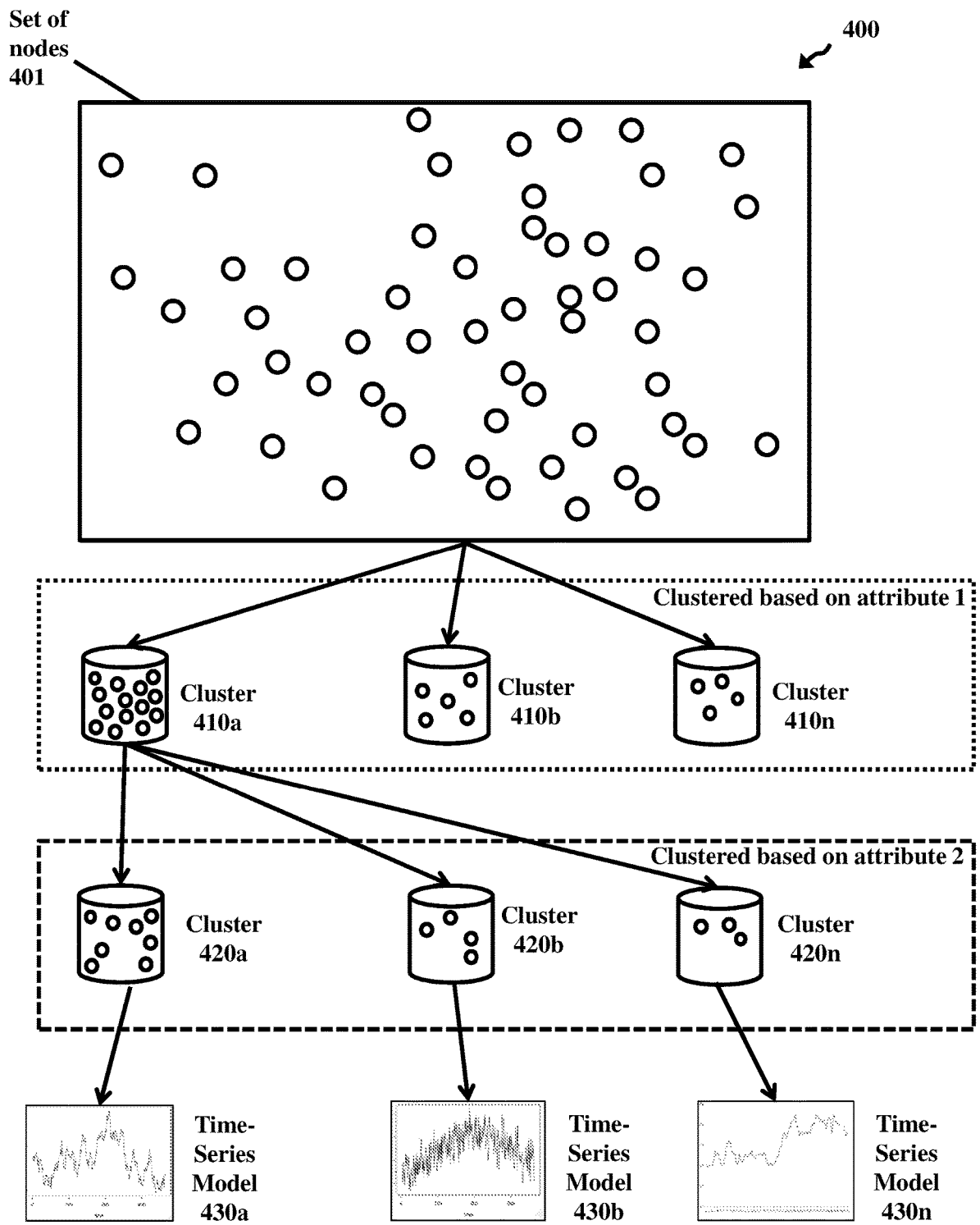
FIG. 4 illustrates a non-limiting example of generating a prediction model for each cluster within a set of nodes, according to an embodiment.

FIG. 3 illustrates a non-limiting example of generating a secondary prediction model for each cluster within a set of nodes, according to an embodiment. Non-limiting example 300 illustrates how a central server, such as the analytics server described herein, can efficiently execute one or more computer models to generate a secondary prediction model to predict (correct) future attributes for various nodes predicted by a primary model. In the example 300, the set of nodes 310 represents a set of users. However, it is expressly understood that in other embodiments, the set of nodes may represent other data. For instance, each node may represent an electronic device. Therefore, the example 300 does not limit the methods and systems described herein.

In the non-limiting example 300, the analytics server leverages clustering algorithms to generate secondary and corrective prediction models. The analytics server may then execute the secondary prediction models in conjunction with the primary prediction model to identify a future attribute for a new node/user (i.e., node 311). As illustrated, node 311 may not be a part of the set of nodes 310. Therefore, the analytics server may not have any (or have very limited) previous historical data regarding the node 311 stored within its database. For instance, node 311 may represent a new user for whom the analytics server has not monitored or gathered any data.

As depicted in FIG. 3, the analytics server may first execute various analytical and clustering algorithms on the set of nodes 310 to generate the secondary time-series models 330a-n. As will be described below, the analytics server may then identify a secondary time-series model associated with the node 311 and may execute that secondary time-series model to identify a future value of the node 311. The system and methods described herein may be performed in various orders and different sequences. For instance, in some configurations, the analytics server may cluster the nodes and generate the secondary prediction models in response to receiving a request to identify a future value of the node 311. In some other embodiments, the analytics server may continuously generate/revise the secondary prediction models. As a result, the analytics server may generate the secondary models before receiving the request to predict future attributes of the node 311.

The analytics server may first retrieve the set of nodes 310 from an internal or external database. As described above, each node within the set of nodes 310 represents an existing customer and the analytics server may retrieve all attribute data associated each node. Leveraging cluster methodologies described above, the analytics server may the segment of nodes 310 into multiple clusters 320a-n. Each cluster may include users having similar attributes, such as the attributes of prior spend in previous three months, number of transactions in the previous six months, days since last transaction, demographic data (e.g., age, income, geographic location), and the like. Thus, the users in the same cluster have similar attributes.

The analytics server may cluster the nodes using a single or multiple dimensional clustering method. Therefore, the analytics server may generate multiple clusters. In the depicted example, the analytics server clusters the set of nodes 310 based on a first attribute (e.g., prior spend in previous 3 months) into clusters 320a-320c. The analytics server then also clusters the same nodes (set of nodes 310)

based on a different attribute (e.g., income level) into clusters 320d-340n. In some configurations, the analytics server may cluster the set of nodes 310 into only one set of clusters where the clustering is based on multiple attributes (e.g., age, income, prior spent, and location).

As described above, because the primary prediction model is generated based on all nodes within the set of nodes, it is not granular. Consequently, execution of the primary prediction model may not result in accurate values. To remedy this technical inaccuracy, the analytics server may generate the secondary prediction models (time-series models 330a-n). The analytics server may then execute the newly generated secondary prediction models in conjunction with the primary prediction model to provide more accurate predicted results. Accordingly, the secondary prediction models are corrective in nature and designed to correct the results generated via the primary prediction model. Moreover, the methods and systems described herein can be used to retrofit an existing computer software solution.

Leveraging the modeling techniques described above, the analytics server may then execute a primary prediction model to calculate attributes associated with each node within the set of nodes 310. An example of a primary prediction model may be a time-series model (or any prediction model) that has been generated based on all the nodes within the set of nodes 310. The analytics server may execute the primary prediction model to predict known values for each nodes within the set of nodes 310. The analytics server may then compare the known values of each cluster with the values generated by the primary prediction model and generate a secondary corrective prediction model accordingly. This process is further described in FIGS. 5A-5F.

The analytics server may generate a secondary time-series (or other prediction computer models) for each cluster of nodes. The analytics server generates the secondary time-series model using data associated with its corresponding cluster. For instance, the analytics server generates the secondary prediction model 330a based on data associated with nodes within the cluster 320a. Accordingly, the analytics server may generate secondary prediction models 330a-330c where each time-series model corresponds to a cluster within clusters 320a-320c. Moreover, secondary prediction models 330d-350n correspond to clusters 320d-n.

The analytics server may generate one secondary prediction model per attribute and per cluster. For instance, for cluster 320a, the analytics server may generate a first secondary prediction model for time vs "money spent in the past three months," a second secondary prediction model for time vs "number of transactions," and a third secondary prediction model for time vs "amount per transaction." Therefore, the analytics server may generate a multitude of secondary prediction models where the number of secondary prediction models corresponds to the number of clusters and attributes. Using the methods and systems described herein, the analytics server can efficiently identify a relevant model and only execute one or more needed and not all models (or a holistic model that includes every node), as it has been conventionally done.

In some configurations, the analytics server may cluster the set of nodes 310 based on the attributes associated with the node 311. For instance, if the analytics server receives a request to identify a future number of transactions per month for a new user whose income is $150,000 and lives in Texas, the analytics server may retrieve a set of users who live in Texas and segment the users into different clusters based on their respective income. Additionally or alternatively, the analytics server may cluster the set of nodes 310 based on attributes other that the attributes known for the node 311.

In some configurations, the analytics server may iteratively cluster the set of nodes 310 and generate the secondary prediction models accordingly. For instance, the analytics server may first cluster the set of nodes 310 into a first set of clusters based on a first attribute (e.g., age) and then re-cluster the nodes within each first set of clusters into a second set of clusters based on a second attribute (e.g., income). The analytics server may then generate the time-series models for each cluster within the second set of clusters. For instance, each time-series model may only correspond to the set of nodes that have been clustered based on age and income. The analytics server may repeat the above-mentioned iterative clustering method as many times to achieve a more granular time-series model. Using the hierarchical (e.g., multi-layered) clustering described above, the analytics server may increase accuracy of the results.

FIG. 4 depicts an example of iterative or multi-layered clustering, in accordance with an embodiment. In example 400, the analytics server clusters a set of nodes 401 into a first set of clusters 410a-410n based on a first attribute (e.g., age). The analytics server may then further cluster each cluster 410a-410n into a second set of clusters 420a-420n based on a second attribute (e.g., income). The analytics server may repeat the above-descried process multiple time, thereby generating a multi-layer clustering structure. The analytics server may then generate secondary prediction models for each cluster 410a-410n (or the last layer of the multi-layer clustering structure), such as the time-series models 430a-430n. For clarity, FIG. 4 only depicts a two-layer clustering structure. In some configurations, the number of layers and the attributes may correspond to known attributes associated with the new user (e.g., node 311 in FIG. 3). For instance, if the analytics server retrieves age, location, and education, the analytics server may cluster the set of nodes based on age (first layer), location (second layer), and education (third layer).

Figure 2B:
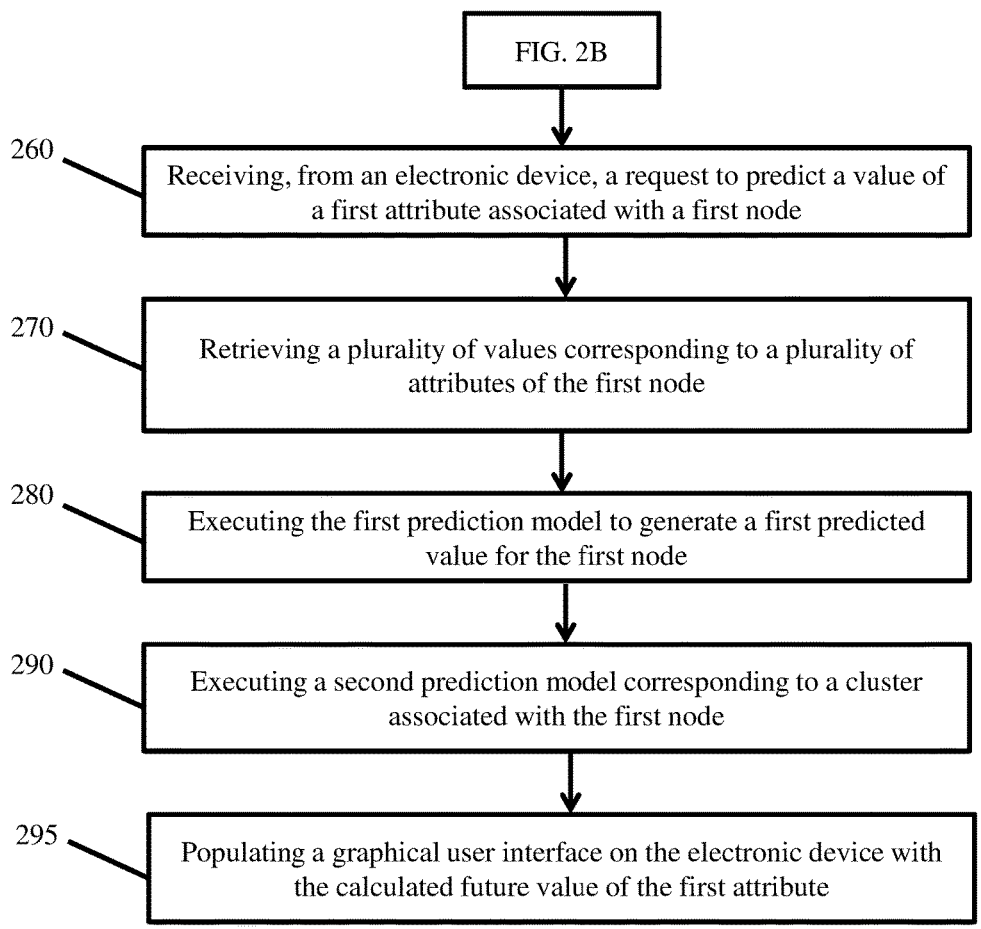

Referring now to FIG. 2B, at step 260, the analytics server may receive, from an electronic device, a request to predict a value of a first attribute associated with a first node. The analytics server may receive a request to predict an attribute (future or present) associated with a node. The request may comprise an identifier of the node. The identifier may be any indicator identifying the user/computing device associated with the node.

The analytics server may generate a graphical user interface in order to provide services to a variety of clients (e.g., administrator or users). In an embodiment, the graphical user interface may be a website hosted by the analytics server, which is available to different clients. The purpose of said website may be to provide a platform to securely upload data and/or send requests to the analytics server to predict future attributes of different nodes (users).

In some embodiments, the analytics server may also automatically receive the request from an electronic source with little or no human intervention. The analytics server may utilize an application-programming interface (API) to receive requests from different electronic sources. For example, an API locally installed on the administrator computing device and in direct communication with the analytics server may automatically transmit one or more (e.g., batch) requests to the analytics server.

At step 270, the analytics server may retrieve a plurality of values corresponding to a plurality of attributes of the first node. The analytics server may retrieve, from a database, at least a plurality of values corresponding to a plurality of attributes associated with the first node. The analytics server may use the identifier received to identify the requested node. In response to identifying the requested node, the analytics server may then use the identifier to query attributes associated with the identified node. For instance, in an example where nodes represent different users, the analytics server may receive the name or account number of a user. The analytics server may then use the user's name/account number to query an internal or external database to retrieve other relevant information, such as account information, transaction history, demographic data, and the like.

At step 280, the analytics server may execute the first prediction model to generate a first predicted value for the first node. The analytics server may use the retrieved attributes of the first node and execute the first prediction model (e.g., holistic time-series model generated in step 210) to identify a future value for the first node. The analytics server may retrieve a prediction model generated for all the users or a subset of the users to generate a preliminary prediction value for the first node. The analytics server may execute the prediction model using the data retrieved and step 270 and may receive a preliminary prediction value for the first node.

In some configurations, the analytics server may select/retrieve a first prediction model that correspond to the request and/or the first node's attributes. For instance, if the first node has a location attribute of Texas, the analytics server may retrieve a first prediction model for users within Texas.

At step 290, the analytics server may execute a second prediction model corresponding to a cluster associated with the first node. The analytics server may, in response to identifying a cluster associated with the first node, retrieve a second prediction model within the plurality of second computer models that corresponds to the identified cluster. The analytics server may also execute the retrieved second prediction model by inputting the first predicted value to receive a second predicted value.

The analytics server may first identify a cluster that most resembles the attributes of the first node. The analytics server may identify a cluster associated with the first node. As described above, the analytics server may calculate a distance between the identified node and the users within different clusters. The analytics server may calculate the distance to identify a cluster of users that are most similar to the identified user. The analytics server may calculate the distance using the attribute(s) used to cluster the set of nodes. For instance, if the set of nodes are clustered based on age, then the analytics server may use "age" to identify a cluster of nodes most similar to the identified node. Therefore, if the analytics server clusters the set of nodes based on age, the analytics server may generate three clusters of users where the first cluster comprises users with an age range of 18-25, a second cluster comprising user with an age range of 26-45, and a third cluster comprising users with an age range of 46-80. When the analytics server identifies that the identified user corresponding to the first node is 48 years old, the analytics server determines that the third cluster of users is the most similar cluster of users to the identified user.

The analytics server may also identify and retrieve a second prediction model associated with the identified cluster. Once identified/retrieved, the analytics server may then execute the second prediction model (identified above) using the first node's attributes and/or the first value predicted (step 280).

Figure 7:
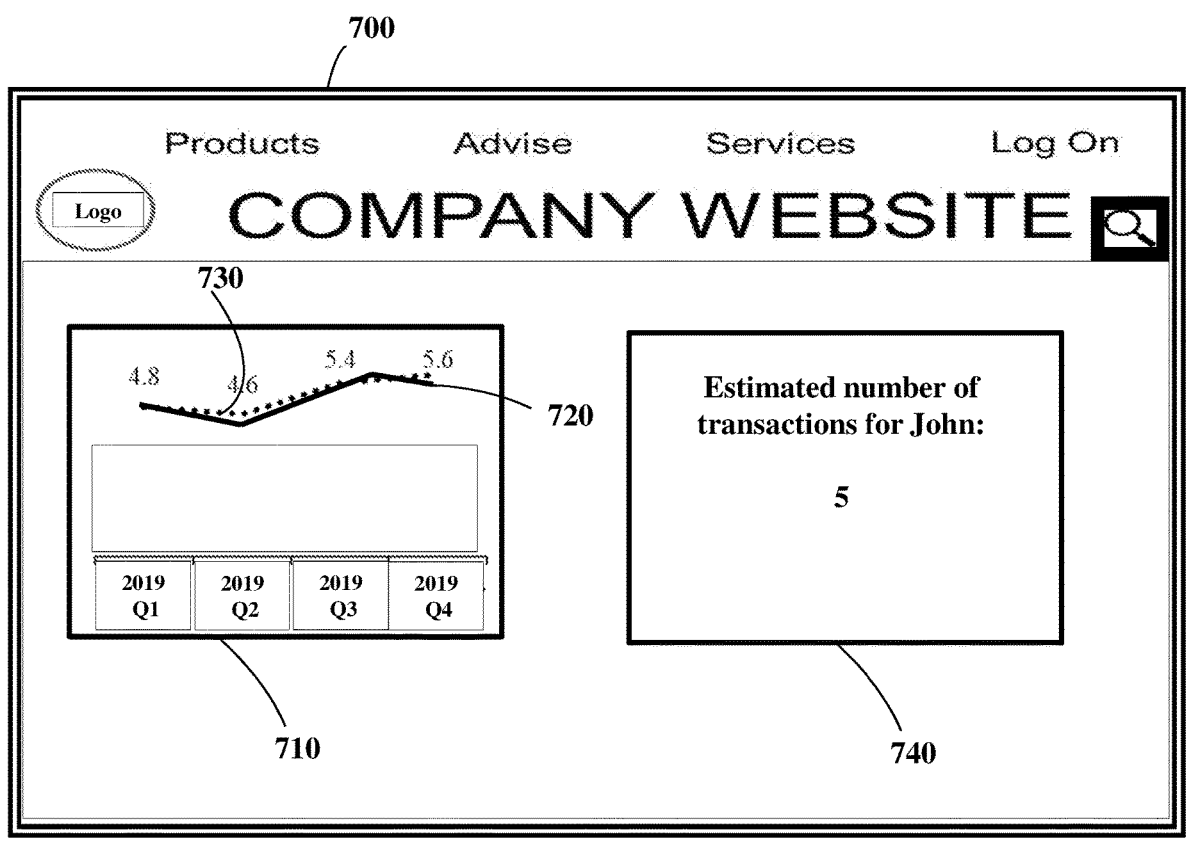
FIG. 7 illustrates an example of a graphical user interface generated by the analytics server, according to an embodiment.

At step 295, the analytics server may populate a graphical user interface on the electronic device with the calculated future value of the first attribute. FIG. 7 depicts a graphical user interface displayed by the analytics server, according to an embodiment. The analytics server may populate a GUI 700 to display the results calculated using the methods and systems described herein. An example of the GUI 700 may be a website. As described above, the analytics server may host a website accessible to different users where the website displays results of the methods and systems described herein. For instance, an end user may log in the website to submit a request to the analytics server. The request may include identification of the new user. The end user may directly input the new user's attributes using one or more input elements displayed on the GUI 700 (not shown). The website may also display the results as depicted in GUI 700.

In some embodiments, GUI 700 may be a website where only a portion of the website is populated by the analytics server. The website may contain code, such as HTML or PHP, presenting a website of any number of webpages having a common "look-and-feel." The code may also define one or more containers displaying information or data that is configured to be dynamically generated using ongoing analysis performed by the analytics server. The analytics server may populate the sub-interfaces or containers using the results of execution of the methods and systems describe herein, while the webpage display is configured to maintain the website's common aesthetic.

Container 710 may include a graphical representation of the execution of one or more prediction models. For instance, as depicted, the analytics server may display a graph representing a number of transactions predicted for a new user (line 720). The analytics server may also display line 730 that displays a relative value for other existing users (e.g., number of transactions per existing user predicted for the same time periods). The analytics server may also populate container 740 with a numerical value that represents the results.

Referring now to FIG. 2B, in some configurations, multiple servers may perform one or more steps of the method 200. Accordingly, the analytics server may distribute one or more steps of the method 200 among multiple servers to increase efficiency. For instance, while the analytics server may retrieve the set of nodes, the analytics server may instruct a second server to cluster the nodes and/or generate the time-series models. Furthermore, the analytics server may instruct a third server to execute the primary or secondary time-series models in order to display the results. Some of the processes or execution steps described above may be simultaneously performed to increase efficiency.

Figure 6:
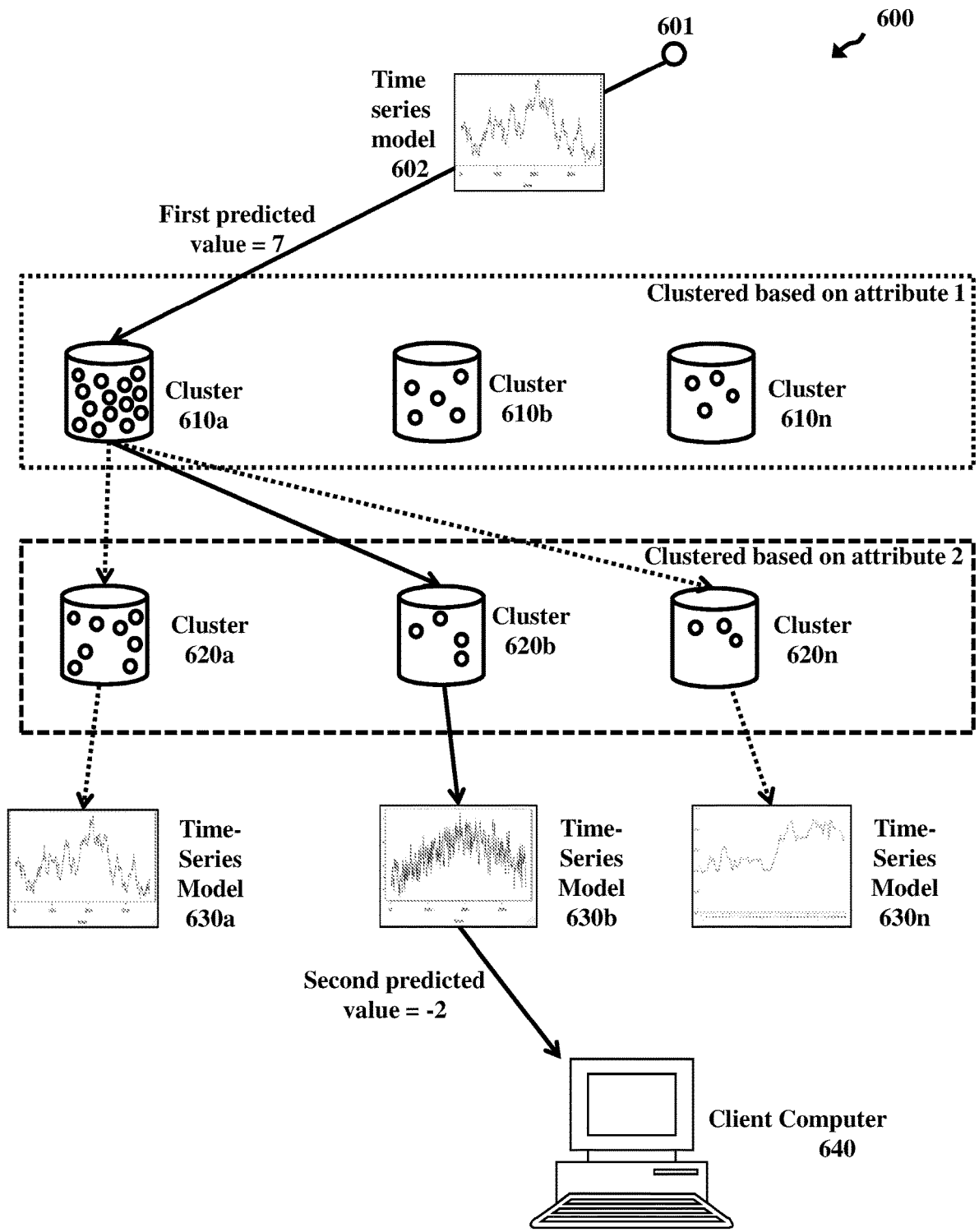
FIG. 6 illustrates a non-limiting example of predicting a future value of a node, according to an embodiment.

Referring now to FIG. 6, a non-limiting example of predicting a future attribute for a node, according to an embodiment (example 600). As depicted, when the analytics server receives a request to identify a future attribute of node 601, the analytics server may first retrieve a primary prediction model, such as the time-series model 602. The analytics server may retrieve the time-series model 602 that corresponds to the requested attribute of node 601. For instance, if the analytics server receives a request to predict a number of transactions for the node 601, the analytics server may retrieve a time-series model that is configured to predict a number of transactions. As described above, time-series model 602 represents a holistic and aggregated prediction model for the entire (or sometimes a segment of) set of nodes (e.g., existing users).

As depicted, the analytics server may execute the time-series model 602 to calculate a future number of transactions for the node 601. Upon executing the time-series model using all attributes associated with node 601. For instance, the analytics server may query to identify demographic data, spending habits, or any other data associated with the node 601. In some embodiments, the analytics server may receive these attributes from the client computer 640 or query a third-party database. The analytics server may then execute the time-series model 602 (using the attribute known for the node 601, which includes "age" and "income") and calculate a first predicted value (e.g., 7 transaction for node 601 in the next quarter). The analytics server may then identify one or more clusters associated with the node 601. As described above, the analytics server may identify a cluster most similar to the attributes of the node 601. The first layer of clusters may be generated based on attribute 1 (e.g., age).

As depicted, the analytics server determines that node 601 is most similar to the nodes within cluster 610a. The analytics server then identifies a second clusters within cluster 610a that is most similar to the node 601. The second layer of clusters may be generated based on a second attribute (e.g., income level). As depicted, the analytics server identifies cluster 620b as the most similar to the node 601. Upon identifying the cluster 620b, the analytics server also retrieves a secondary (corrective) prediction model (time-series model 630b) that correspond to the cluster 620b. In some configurations, time series models 630a-n may correspond to the model 602 where the time series models 630a-n have an additional layer of linear regression.

Upon executing the time-series model 630b using the first predicted value and/or one or more attributes associated with the node 601, the analytics server calculates the second predicted value for the node 601 (e.g., 5 transaction for node 601 in the next quarter). The analytics server then populates a graphical user interface on the client computer 640 that displays the second predicted value.

The methods and systems described herein allow a computing device to execute a corrective model (in addition to an aggregated prediction model) to generate more accurate results. As will be described below, the methods and systems described herein are not limited to utilizing clustering algorithms.

The analytics server may first generate or retrieve an aggregated prediction model. The aggregated prediction model may be a time-series model that is configured to predict an attribute of a node/customer. For instance, the aggregated prediction model may be configured to predict an attribute of a new customer based on known (historical) customer data. In some configurations, the analytics server may generate an aggregated prediction model based on all known historical data associated with a number of transactions conducted for each customer. The analytics server may then use the methods and systems described herein to execute said model and to predict a number of transactions for a new customer.

To generate the aggregated prediction model, the analytics server may first retrieve historical data associated with a set of nodes/customers within a training pool or a training set. For instance, the analytics server may retrieve all known number of transactions per period for existing customers (customer training pool). The analytics server may then aggregate the customer time-series across all customers within the training pool. This will reduce noise and lead to generation and execution of a more accurate model. For instance, the analytics server may generate an average number of transactions (per period) for all the customers within the training pool.

Upon aggregating/averaging customer attributes, the analytics server may also calculate a difference between the aggregated curve (e.g., value) and each customer's individual attribute. Once the analytics server generates an aggregated curve that represents an average number of transactions per period for all the customers within the training pool, the analytics server calculates a distance between each individual customer's number of transactions per period and the aggregated curve. The difference (also referred to herein as "delta") may be an absolute distance or a percentage difference between each customer's actual value and the value represented for that customer by the aggregated curve. Upon identifying the distances, the analytics server may generate a linear regression model per period based on the customers' distances.

Figure 8:
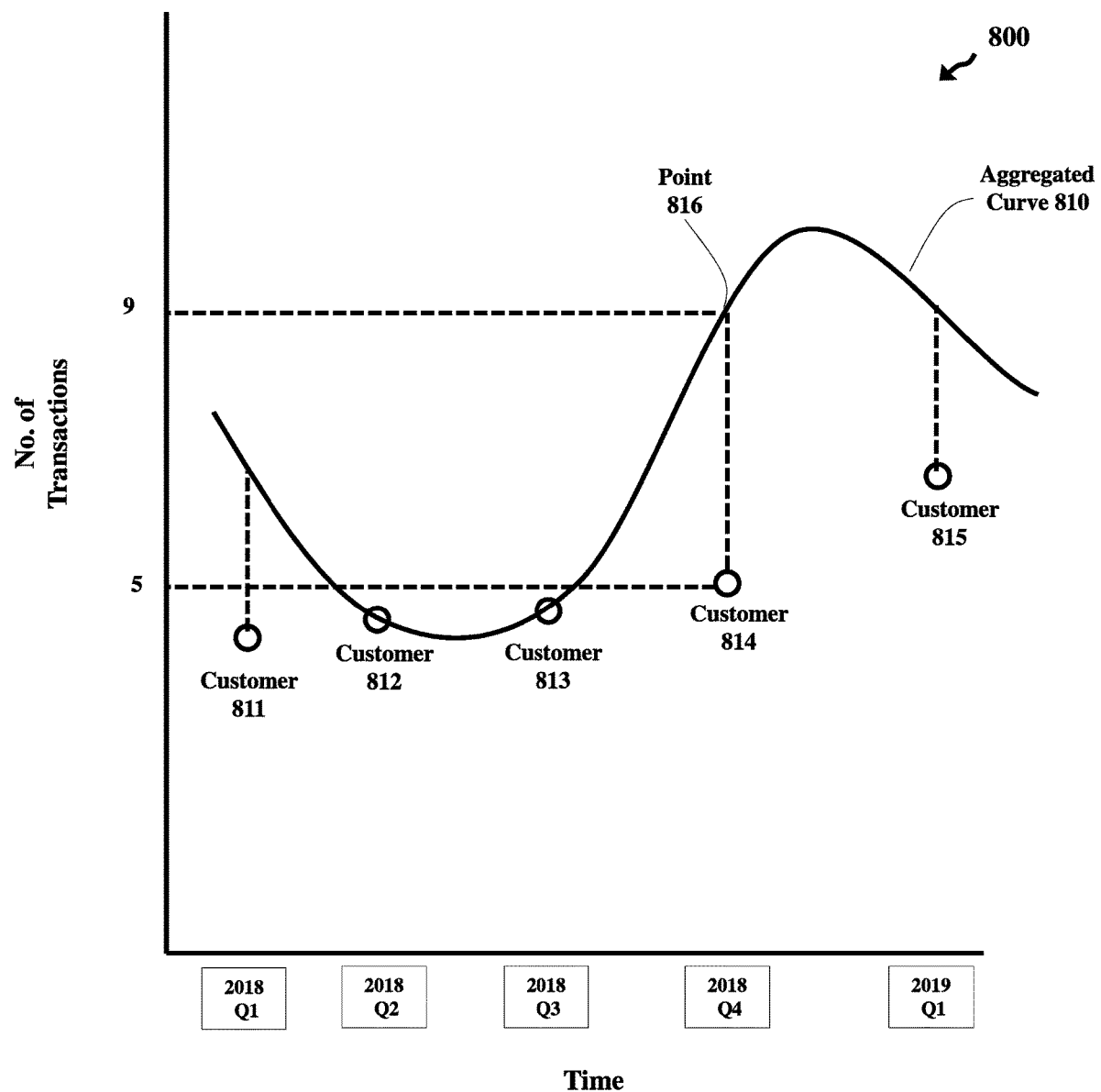
FIG. 8 illustrates a non-limiting example of predicting a future value of a node, according to an embodiment.

Referring now to FIG. 8, a non-limiting example of the modeling techniques described herein is illustrated, according to an embodiment. In the example 800, the analytics server retrieves number of transactions for a set of customers within a training pool. For clarity, FIG. 8 only describes a customer pool of five customers (811-815). However, the analytics server may use a higher number of customers within a customer pool to achieve better/more accurate results.

As illustrated in FIG. 8, the aggregated curve 810 represents an aggregated and averaged number of transactions for all the customers within the customer pool. For instance, point 816 on the aggregated curve 810 illustrates that in the fourth quarter of 2018, the customers within the customer pool had an average of nine transactions per month. As described above, the analytics server may aggregate and average all the number of transactions for all the customers within the training pool to generate the aggregated curve 810. Therefore, the aggregated curve 810 may not represent highly accurate results for each individual customer.

The analytics server may also identify a distance between actual customers within the training pool and the aggregated curve 810. For instance, the analytics server may identify a distance between the actual number of transactions for the customers 811-815 and the aggregated curve 810. As illustrated, customers 812 and 813 do not have a statistically meaningful distance with the aggregated curve 810. However, customers 811, 814, and 815 have number of transactions that are inconsistent with the aggregated curve 810. For instance, customer 814 had five transactions in the fourth quarter of 2018. However, the aggregated curve 810, which represents the average number of transactions for all the customers within the training pool, indicates that an average customer had nine transactions within the same period. Therefore customer 814 has a distance/delta value of 4.

Using the distances calculated, the analytics server may generate a linear regression model per period that corresponds to the customers' distance values based on a combination of relevant customer attributes and predictors. As described above, the analytics server may use various techniques to generate a linear regression model. Upon generating this linear regression model, the analytics server may predict attributes of new customers.

For prediction of an attribute of a customer within a test set (e.g., to predict an attribute of a new customer), the analytics server may first aggregate the test customer time-series into an aggregate time-series. If the analytics server is predicting attributes (e.g., number of transactions per period) for multiple customers, the analytics server may aggregate the test customer time-series into an aggregated time-series. For instance, the analytics server may aggregate known attributes about the customers within the test pool.

The analytics server may then use various time-series forecast techniques (e.g., auto regressive integrated moving average) to forecast the aggregated curve up to the time frame of the training customer set. As a result, the analytics server may generate a predicted aggregated curve for the test set that resembles the aggregated curve 810.

As described above, the aggregated curves may not be highly accurate. Therefore, the analytics server may, for each customer and time period, apply the respective linear regression model on customer attributes to predict the distance between each customer and the value represented within the aggregated curve. The analytics server may then apply the distance to the value predicted using the aggregated curve to produce a better predicted value. For instance, the analytics server may execute the model and predict that a customer within the test set will have 12 transactions in the fourth quarter of 2018. However, the analytics server may correct this predicted value based on the distance of customer 814 and the aggregated curve 810. As a result, the analytics server may predict that the customer within the test set will have 8 transactions in that period of time (not 12).

As described above, the analytics server may iteratively perform these calculations for various time periods. Therefore, the analytics server may generate an individual model per time period (or other attributes other than time) or may generate a model that includes multiple time periods. The analytics server may also periodically/continuously update the prediction model using newly retrieved data to ensure that the prediction model is as accurate as possible.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
   receiving, by a server from an electronic device, a request to predict a value of a first attribute associated with a first node;
   retrieving, by the server, a plurality of values corresponding to a plurality of attributes of the first node;
   executing, by the server using the plurality of values retrieved, a first prediction computer model to generate a first predicted value for the first node;
   executing, by the server, a clustering computer model to identify a cluster of nodes from a first set of clusters, the first set of cluster corresponding to at least one value of the plurality of values similar to the first node, each cluster of the first set of cluster having a corresponding second prediction computer model from a set of second prediction computer models, wherein each second prediction computer model is trained using a difference between a predicted attribute for each cluster generated by the first prediction computer model and a corresponding actual attribute for each respective cluster;
   identifying, by the server, a second prediction computer model based on the identified second set of clusters within most similar to the first set of cluster value, the second prediction computer model chosen from the set of second prediction computer models that correspond to the second set of clusters, wherein the identified second prediction computer is configured to correct an output of the first prediction model;
   executing, by the server, only the identified second prediction computer model by inputting the first predicted value to receive a second predicted value; and populating, by the server, a graphical user interface on the electronic device with the requested value representing the first predicted value corrected via the second predicted value.

2. The method of claim 1, wherein the prediction model is a time-series prediction model.

3. The method of claim 1, wherein the clustering computer model utilizes a multi-dimensional distance algorithm to cluster the set of nodes.

4. The method of claim 1, wherein the server generates each prediction model using only values associated with a single corresponding cluster.

5. The method of claim 1, wherein the server clusters the set of nodes based on at least one of the first attribute and the future value of the first attribute.

6. The method of claim 1, wherein the server clusters the set of nodes based on a category of attributes corresponding to the retrieved data associated with the first node.

7. The method of claim 1, wherein the one or more attribute comprises at least one of demographic data, transaction data, and account data.

8. A computer system comprising:
   an electronic device configured to generate and transmit a request to determine a future value of first attribute associated with a first node;
   a database configured to store data associated with a set of nodes;
   a server in communication with the database and the electronic device, the server configured to:
   receive, from an electronic device, a request to predict a value of a first attribute associated with a first node;
   retrieve a plurality of values corresponding to a plurality of attributes of the first node;
   execute, using the plurality of values retrieved, a first prediction computer model to generate a first predicted value for the first node;
   execute a clustering computer model to identify a cluster of nodes from a first set of clusters, the first set of cluster corresponding to at least one value of the plurality of values similar to the first node, each cluster of the first set of cluster having a corresponding second prediction computer model from a set of second prediction computer models, wherein each second prediction computer model is trained using a difference between a predicted attribute for each cluster generated by the first prediction computer model and a corresponding actual attribute for each respective cluster;
   identify a second prediction computer model based on the identified second set of clusters within most similar to the first set of cluster value, the second prediction computer model chosen from the set of second prediction computer models that correspond to the second set of clusters, wherein the identified second prediction computer is configured to correct an output of the first prediction model;
   execute only the identified second prediction computer model by inputting the first predicted value to receive a second predicted value; and
   populate a graphical user interface on the electronic device with the requested value representing the first predicted value corrected via the second predicted value.

9. The system of claim 8, wherein the prediction model is a time-series prediction model.

10. The system of claim 8, wherein the clustering computer model utilizes a multi-dimensional distance algorithm to cluster the set of nodes.

11. The system of claim 8, wherein the server generates each prediction model using only values associated with a single corresponding cluster.

12. The system of claim 8, wherein the server clusters the set of nodes based on at least one of the first attribute and the future value of the first attribute.

13. The system of claim 8, wherein the server clusters the set of nodes based on a category of attributes corresponding to the retrieved data associated with the first node.

14. The system of claim 8, wherein the one or more attribute comprises at least one of demographic data, transaction data, and account data.

15. A computer system comprising:
    a server configured to:

receive, from an electronic device, a request to predict a value of a first attribute associated with a first node;

retrieve a plurality of values corresponding to a plurality of attributes of the first node;

execute, using the plurality of values retrieved, a first prediction computer model to generate a first predicted value for the first node;

execute a clustering computer model to identify a cluster of nodes from a first set of clusters, the first set of cluster corresponding to at least one value of the plurality of values similar to the first node, each cluster of the first set of cluster having a corresponding second prediction computer model from a set of second prediction computer models, wherein each second prediction computer model is trained using a difference between a predicted attribute for each cluster generated by the first prediction computer model and a corresponding actual attribute for each respective cluster;

identify a second prediction computer model based on the identified second set of clusters within most similar to the first set of cluster value, the second prediction computer model chosen from the set of second prediction computer models that correspond to the second set of clusters, wherein the identified second prediction computer is configured to correct an output of the first prediction model;

execute only the identified second prediction computer model by inputting the first predicted value to receive a second predicted value; and populate a graphical user interface on the electronic device with the requested value representing the first predicted value corrected via the second predicted value.

16. The system of claim 15, wherein the prediction model is a time-series prediction model.

17. The system of claim 15, wherein the clustering computer model utilizes a multi-dimensional distance algorithm to cluster the set of nodes.

18. The system of claim 15, wherein the server generates each prediction model using only values associated with a single corresponding cluster.

19. The system of claim 15, wherein the server clusters the set of nodes based on at least one of the first attribute and the future value of the first attribute.

20. The system of claim 15, wherein the server clusters the set of nodes based on a category of attributes corresponding to the retrieved data associated with the first node.

* * * * *